United States Patent
Ji (10) Patent No.: US 11,560,086 B2
(45) Date of Patent: Jan. 24, 2023

(54) DETACHABLE VEHICLE-TRAVELING GUIDANCE SYSTEM AND METHOD OF GUIDING VEHICLE TRAVELING

(71) Applicant: HYUNDAI MOBIS CO., LTD., Seoul (KR)

(72) Inventor: Yong Kwan Ji, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/529,698

(22) Filed: Nov. 18, 2021

(65) Prior Publication Data

US 2022/0185172 A1  Jun. 16, 2022

(30) Foreign Application Priority Data

Dec. 16, 2020  (KR) .......................... 10-2020-0176769

(51) Int. Cl.
*B60Q 1/26* (2006.01)
*B60Q 1/50* (2006.01)

(52) U.S. Cl.
CPC ............... *B60Q 1/26* (2013.01); *B60Q 1/525* (2013.01)

(58) Field of Classification Search
CPC .............................. B60Q 1/2611; B60Q 1/525
See application file for complete search history.

(56) References Cited

U.S. PATENT DOCUMENTS

| | | | | |
|---|---|---|---|---|
| 6,812,851 B1* | 11/2004 | Dukach | ................. | G09F 21/042 |
| | | | | 345/212 |
| 10,239,444 B2* | 3/2019 | Kalanick | ................ | G06Q 10/02 |
| 10,308,167 B2* | 6/2019 | Caron | ................. | G06F 3/04842 |
| 10,762,809 B1* | 9/2020 | DeLorean | .............. | G08G 1/042 |
| 10,783,559 B1* | 9/2020 | Tran | .......................... | G09F 9/00 |
| 11,079,765 B2* | 8/2021 | Reiley | .................. | G05D 1/0214 |
| 2002/0065046 A1* | 5/2002 | Mankins | ................... | G08G 1/01 |
| | | | | 455/456.1 |
| 2008/0294520 A1* | 11/2008 | Power | ..................... | G06Q 30/02 |
| | | | | 705/14.62 |
| 2014/0081764 A1* | 3/2014 | James | ................ | G06Q 30/0265 |
| | | | | 705/14.62 |
| 2014/0257969 A1* | 9/2014 | Topchy | .............. | G06Q 30/0242 |
| | | | | 705/14.42 |
| 2016/0144695 A1* | 5/2016 | Higgins | .................... | B60J 7/057 |
| | | | | 701/49 |
| 2016/0167648 A1* | 6/2016 | James | .................... | B60Q 1/503 |
| | | | | 701/28 |
| 2018/0173237 A1* | 6/2018 | Reiley | ..................... | B60Q 1/46 |
| 2018/0304804 A1* | 10/2018 | Tatara | .................. | B60Q 1/2607 |

(Continued)

FOREIGN PATENT DOCUMENTS

JP  2018-197010 A  12/2018

*Primary Examiner* — Hoi C Lau
(74) *Attorney, Agent, or Firm* — NSIP Law (57) ABSTRACT

Proposed is a detachable traveling guidance system including a frame detachably mounted on a roof of a vehicle, a monitoring module including a sensor array configured to monitor a vicinity of the vehicle and a communicator, the monitoring module being mounted on the frame, and the frame being configured to adjust a position of the monitoring module, and a display mounted on a lower portion of the frame and positioned to cover a side surface or a rear surface of the vehicle, necessary information being output on the display device for viewing from the outside.

17 Claims, 8 Drawing Sheets

(56) References Cited

U.S. PATENT DOCUMENTS

| | | | |
|---|---|---|---|
| 2019/0058248 A1* | 2/2019 | Kopelman | H01Q 1/24 |
| 2019/0266643 A1* | 8/2019 | Cho | B60Q 9/00 |
| 2019/0266644 A1* | 8/2019 | Cho | G09F 27/005 |
| 2019/0268083 A1* | 8/2019 | Cho | H04W 4/23 |
| 2019/0268743 A1* | 8/2019 | Cho | G06Q 30/0265 |
| 2020/0043058 A1* | 2/2020 | Takemura | G06Q 30/0273 |
| 2020/0070717 A1* | 3/2020 | Garden | G06Q 50/12 |
| 2020/0380934 A1* | 12/2020 | Dawes | G06Q 30/0266 |
| 2020/0410541 A1* | 12/2020 | James | G06Q 30/0266 |
| 2021/0302541 A1* | 9/2021 | Fields | H05K 7/14 |
| 2021/0394793 A1* | 12/2021 | Austin | G08G 1/056 |
| 2022/0044556 A1* | 2/2022 | Luo | G08G 1/0116 |
| 2022/0075057 A1* | 3/2022 | Jones, II | B60R 11/04 |
| 2022/0130254 A1* | 4/2022 | Austin | G08G 1/005 |
| 2022/0159330 A1* | 5/2022 | Stevens | H04N 21/4122 |
| 2022/0185172 A1* | 6/2022 | Ji | B60Q 1/525 |

* cited by examiner

DETACHABLE VEHICLE-TRAVELING GUIDANCE SYSTEM AND METHOD OF GUIDING VEHICLE TRAVELING

CROSS REFERENCE TO RELATED APPLICATION

The present application claims the benefit under 35 USC § 119(a) of Korean Patent Application No. 10-2020-0176769, filed Dec. 16, 2020, in the Korean Intellectual Property Office, the entire disclosure of which is incorporated herein by reference for all purposes.

BACKGROUND OF THE INVENTION

Field

The following description relates to a detachable vehicle-traveling guidance system and a method of guiding vehicle traveling. The system is easily mountable and separable on and from a typical commercial vehicle, such as a typical bus or a truck. Accordingly, the system serves as a supplement to performing an autonomous traveling function and provides an advertisement or various necessary information to the vicinity of the typical commercial vehicle. When equipped with the system, the typical commercial vehicle is capable of functioning as a multi-purpose autonomous vehicle.

Description of Related Art

In recent years, technologies for vehicle electrification and autonomous traveling have been actively under development. However, although autonomous traveling vehicles are widely used, existing old vehicles that are currently in operation need to be equipped with an autonomous traveling function in order to realize a typical autonomous traveling environment.

Most vehicles available on the market are equipped with only a fundamental ADAS function. Therefore, technologies for supplementing the fundamental ADAS function and thus enabling a typical vehicle to function as an autonomous traveling vehicle are necessary.

In addition, in recent years, there has been an increasing interest in development of autonomous traveling vehicles for special purposes. Most of these vehicles have the shape of a box and are easily reconfigured for various purposes, such as a passenger vehicle, a cooking vehicle, a shop vehicle, and a baggage vehicle.

Therefore, through this reconfiguring, existing commercial vehicles in the shape of a box, such as buses and trucks, may function as the autonomous traveling vehicles for multi-purposes. Thus, a typical autonomous traveling environment can be cultivated, and high social costs can be reduced.

The foregoing is intended merely to aid in understanding the background of the present invention and therefore should not be interpreted to admit that the present invention falls within the purview of the related art that is already known to a person of ordinary skill in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter In one general aspect, there is provided a detachable traveling guidance system including a frame detachably mounted on a roof of a vehicle, a monitoring module including a sensor array configured to monitor a vicinity of the vehicle and a communicator, the monitoring module being mounted on the frame, and the frame being configured to adjust a position of the monitoring module, and a display mounted on a lower portion of the frame and positioned to cover a side surface or a rear surface of the vehicle, necessary information being output on the display device for viewing from the outside.

The frame may be a rail-type frame mounted along an edge of the roof of the vehicle.

The monitoring module may be configured to slide along the frame to change a position of the monitoring module on the frame.

The sensor array may include any one or any combination of a camera sensor, a radar sensor, a lidar sensor, and an ultrasonic sensor.

The communicator may be configured to communicate between the sensor array and the vehicle, to communication between the vehicle and another vehicle, or communication between the vehicle and a nearby internetwork infrastructure.

An upper portion of the display device may be connected to the frame and covers a portion other than a glass pane portion of the side surface of the vehicle.

The vehicle may be a commercial vehicle having a gate in a rear side thereof, and the display is mounted on an upper portion of the rear surface of the commercial vehicle that does not interfere with the gate, an upper portion of the display being attached to the frame.

The detachable traveling guidance may include a controller configured to generate information on the basis of information collected through the monitoring module and to output the generated information on the display device.

The controller may be configured to output an advertisement on the display device, and to output the generated necessary information on the display device, in response to the necessary information being generated.

The generated information may include any one or any combination of information associated with a driving of the vehicle, information associated with an occupant of the vehicle, information associated with a traffic situation in the vicinity of the vehicle, and information associated with an emergency situation in the vicinity of the vehicle.

A plurality of sensors may be provided in the sensor array, and the controller may be configured to assign a weight to each of the plurality of the sensors according to a traveling situation of the vehicle, and the plurality of sensors may be configured to monitor the vicinity of the vehicle.

A plurality of sensors may be provided in the monitoring module, and the controller may be configured to assign a weight to each of the plurality of the sensors according to any one or any combination of whether or not the vehicle travels in an autonomous traveling mode or a direction that requires an ADAS function, and the plurality of sensors may be configured to monitor the vicinity of the vehicle, and to provide information on the monitored vicinity of the vehicle to the vehicle through the communicator.

A plurality of sensors may be provided in the monitoring module, and the controller may be configured to assign to each of the sensors a weight according to an environment of a road on which the vehicle travels and the plurality of sensors may be configured to monitor the vicinity of the vehicle.

A plurality of sensors may be provided in the monitoring module, and the controller may be configured to assign a weight to each of the sensors according to a type of road on which the vehicle travels or an amount of traffic on the road, and the plurality of sensors may be configured to monitor the vicinity of the vehicle, and to provide information on the monitored vicinity of the vehicle to the vehicle through the communicator In another general aspect, there is provided a processor-implemented method of guiding a vehicle through a detachable traveling guidance system, the method including monitoring a vicinity of the vehicle using a monitoring module including a sensor array, outputting an advertisement on a display device, generating information on the basis of information collected through the monitoring module, and outputting the generated information on the display device, in response to the information being generated.

A plurality of sensors may be provided in the sensor array, and the generating of the information may include generating the information based on a weight that varies according to a traveling situation of the vehicle, an environment of a road on which the vehicle travels, and the monitoring of the vicinity of the vehicle.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The same name may be used to describe an element included in the examples described above and an element having a common function. Unless otherwise mentioned, the descriptions on the examples may be applicable to the following examples and thus, duplicated descriptions will be omitted for conciseness.

Figure 5:
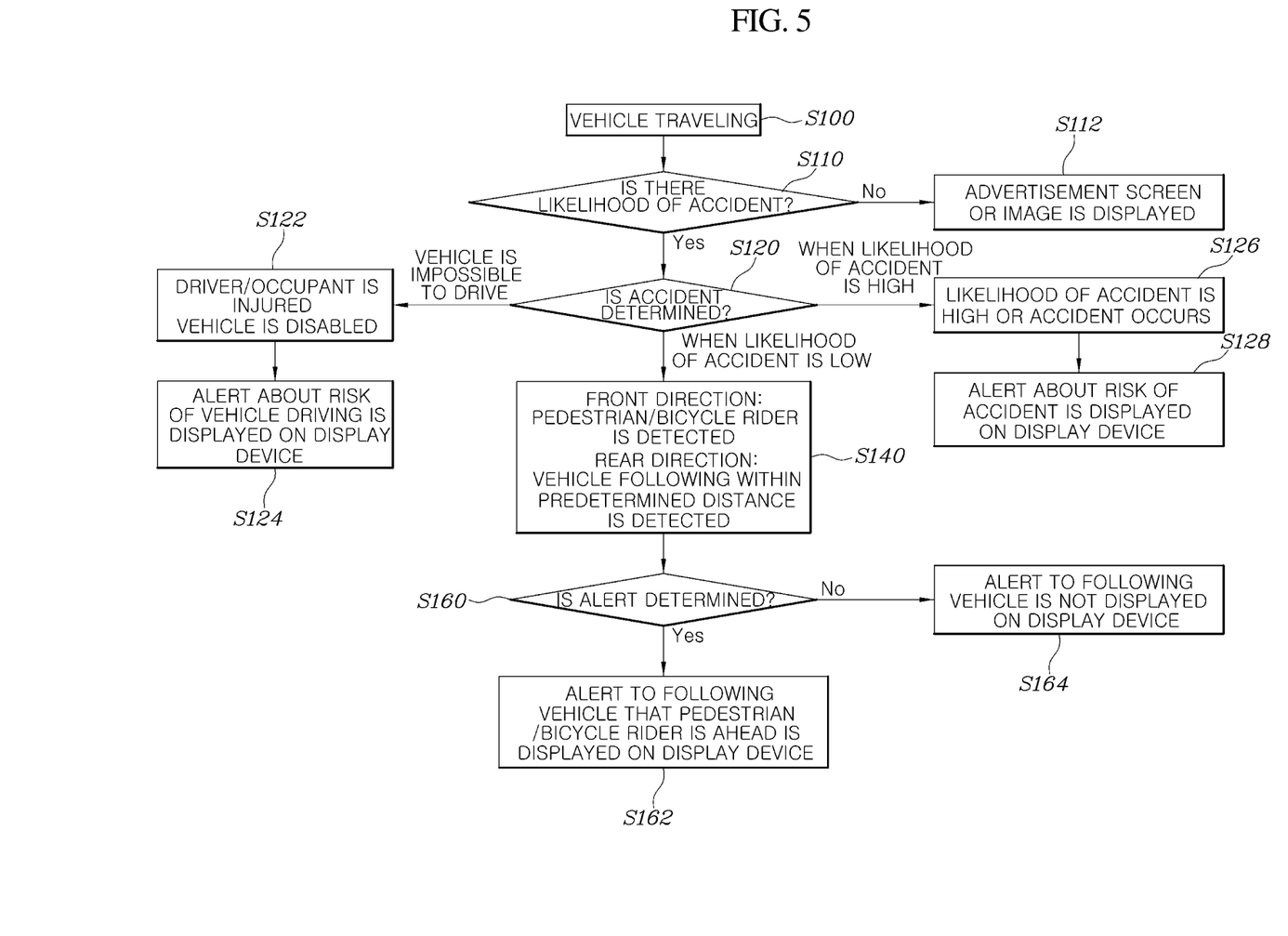
FIG. 5 is a flowchart illustrating operation of the detachable traveling guidance system according to the embodiment of the present invention.
Figure 6:
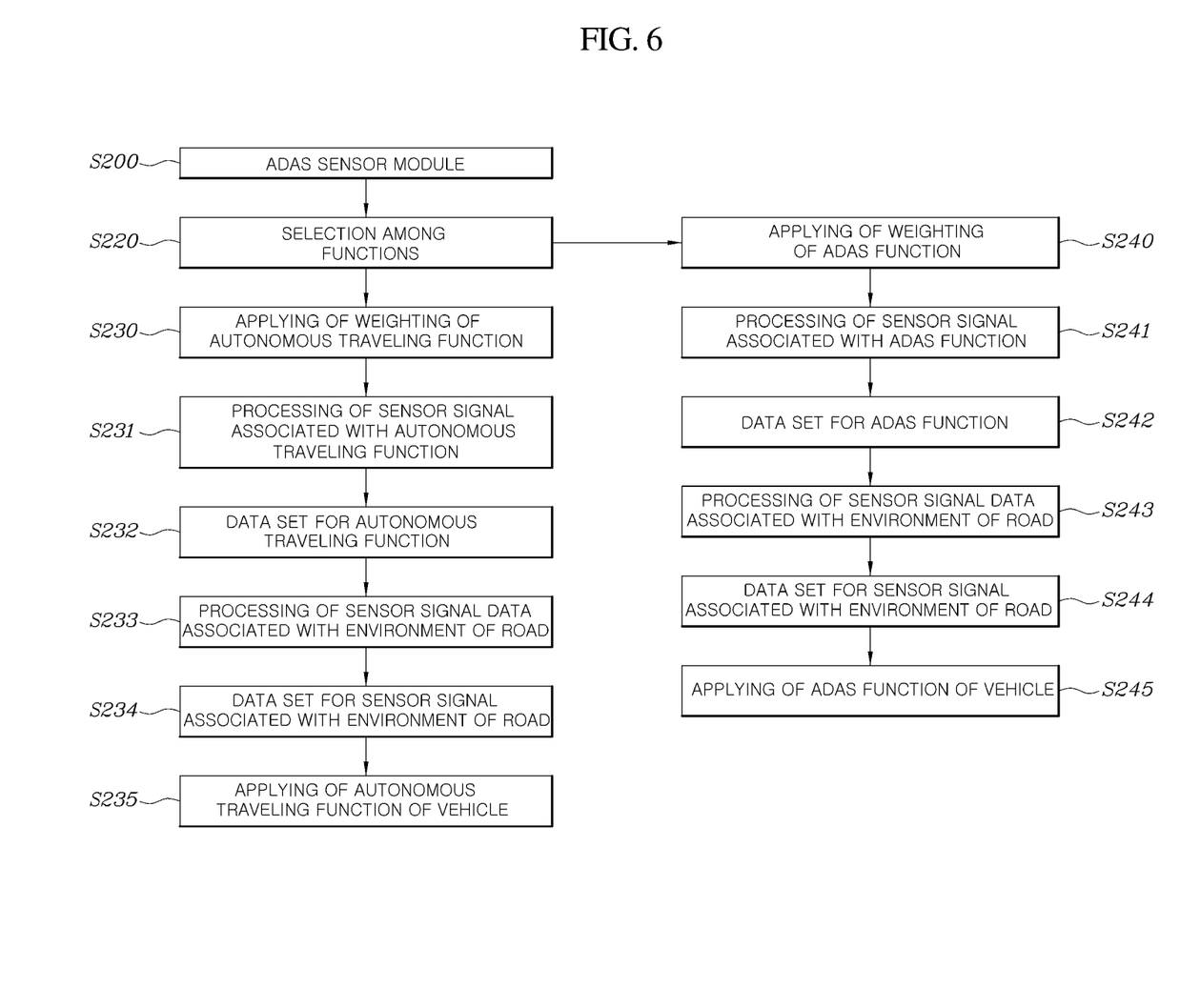
FIGS. 6 and 7 are flowcharts each illustrating situation-dependent data processing by the detachable traveling guidance system according to the embodiment of the present invention.
Figure 7:
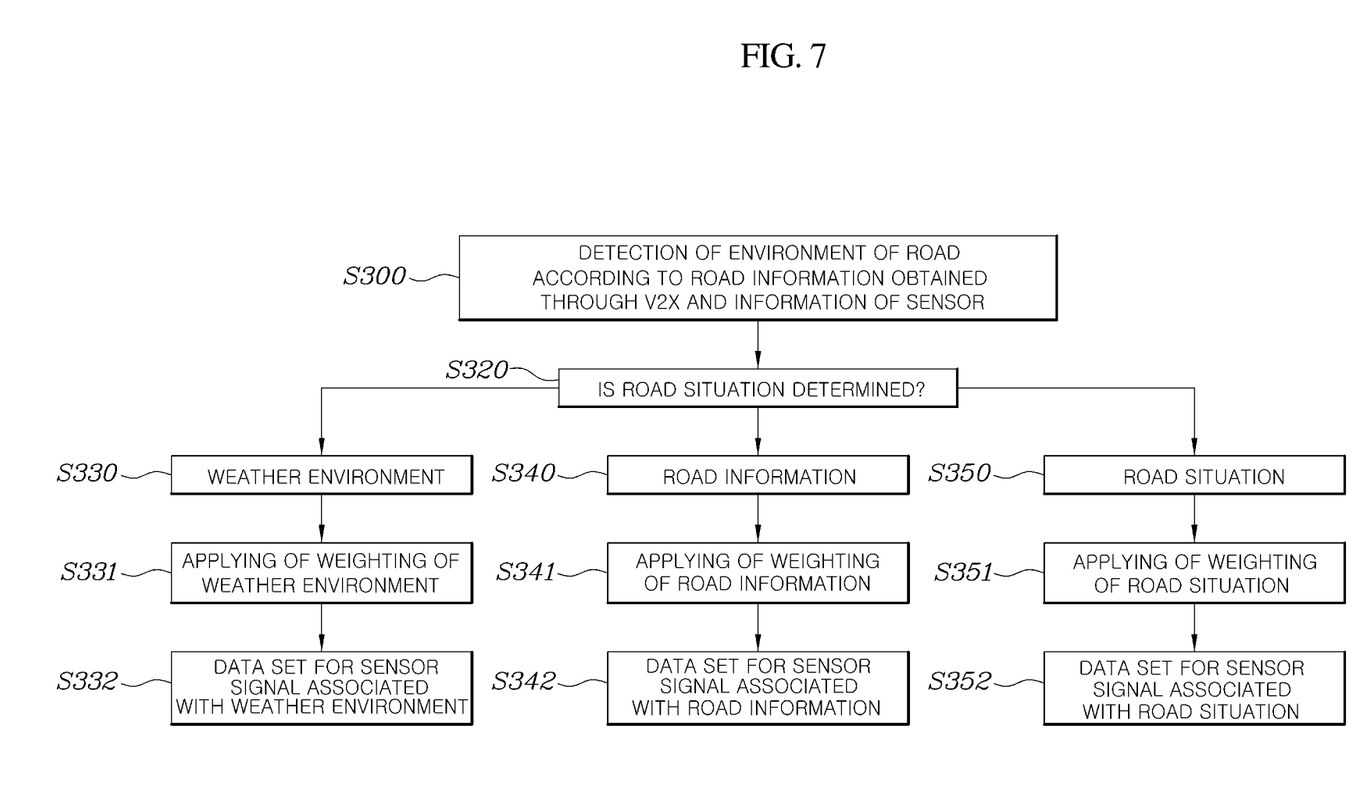
Figure 8:
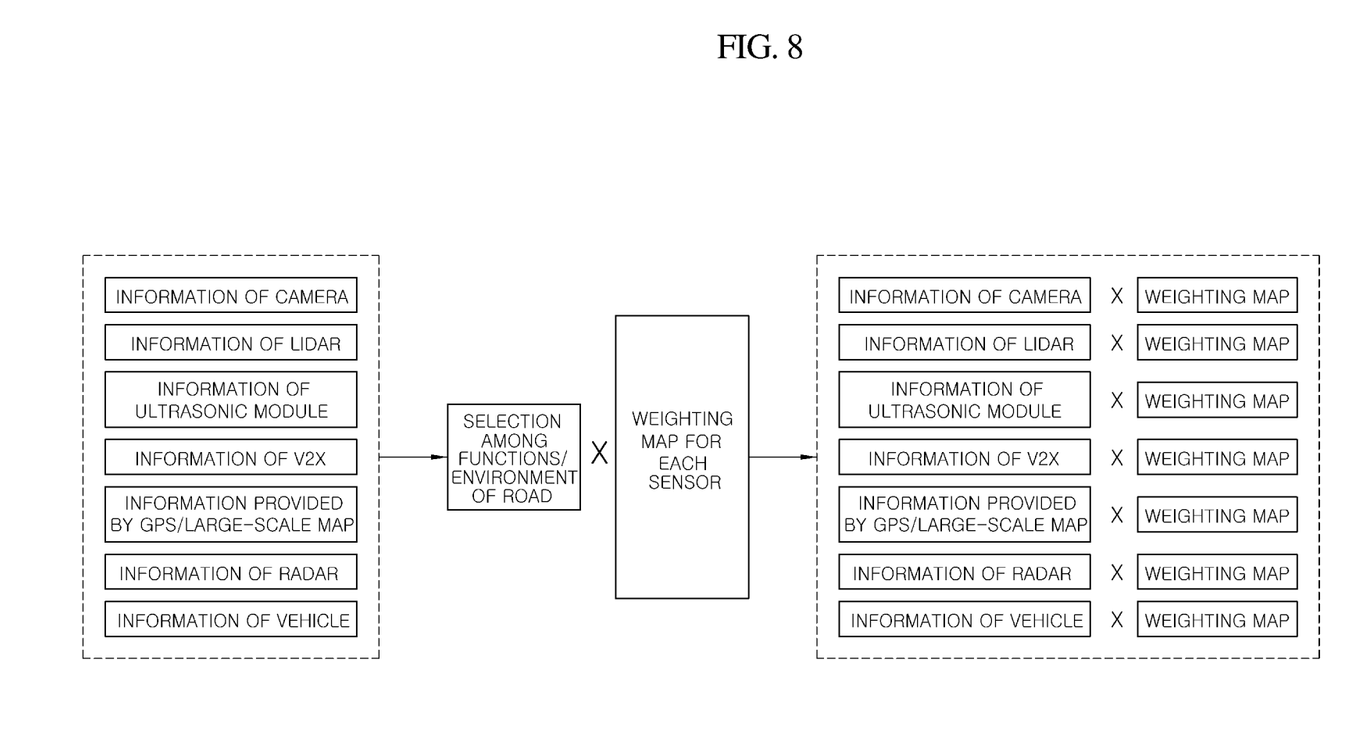
FIG. 8 is a block diagram illustrating a weighting assignment process by the detachable traveling guidance system according to the embodiment of the present invention.

FIGS. 1 to 4 are views each illustrating a state where a detachable traveling guidance system according to an embodiment of the present invention is mounted on a vehicle. FIG. 5 is a flowchart illustrating operation of the detachable traveling guidance system according to the embodiment of the present invention. FIGS. 6 and 7 are flowcharts each illustrating situation-dependent data processing by the detachable traveling guidance system according to the embodiment of the present invention. FIG. 8 is a block diagram illustrating a weighting assignment process by the detachable traveling guidance system according to the embodiment of the present invention.

The detachable traveling guidance system according to the present invention is a system that is mounted on a commercial vehicle, such as a typical bus B or a truck T, to realize an autonomous traveling vehicle that is expandable for various purposes.

A detachable traveling guidance system according to the present invention includes a frame P, a monitoring module M, and display devices D1 and D2 (may also be referred to as display D1 and D2). The frame P is detachably mounted on a roof of a vehicle. The monitoring module M includes a sensor unit S (may also be referred to as the sensor array S) capable of monitoring the vicinity of the vehicle and a communication unit C (may also be referred to as the communicator C) and is mounted on the frame P. A position of the monitoring module M is changeable on the frame P. The display devices D1 and D2 are mounted on a lower end portion of the frame P in such a manner as to cover a flank surface (or a side surface) and a rear surface, respectively, of the vehicle. Necessary information is output on the display devices D1 and D2 for viewing from the outside.

FIGS. 1 to 4 are the views each illustrating the state where the detachable traveling guidance system according to the embodiment of the present invention is mounted on the vehicle. The detachable traveling guidance system according to the present invention is mounted on a commercial vehicle equipped with a fundamental ADAS function. For easy installation and removal of the detachable traveling guidance system, the frame P is provided to be detachably mounted on the upper end portion of the roof of the vehicle. Constituent elements, such as various sensors, are mounted on the frame P. In addition, with the frame P, it is possible that the display devices D1 and D2 are mounted. It is also possible that these constituent elements including display devices D1 and D2 are removed. Therefore, it is unnecessarily to reconfigure an existing vehicle for various purposes. In addition, the advantage of additionally mounting the detachable traveling guidance system is that an autonomous traveling function can also be completely realized. Accordingly, it is possible that an environment-friendly and efficient mobility vehicle is realized.

Particularly, the monitoring module M is mounted on the frame P and the position thereof is changeable on the frame P. The monitoring module M includes the sensor unit S capable of monitoring the vicinity of the vehicle and the communication unit C. The display devices D1 and D2 are mounted on the lower end portion of the frame P to cover the flank surface, the rear surface, respectively, of the vehicle. Necessary information is output on the display devices D1 and D2 for viewing from the outside.

Therefore, the sensor unit S and the communication unit M for autonomous traveling and the display devices D1 and D2 for outputting information are easily mounted on and removed from the vehicle through the frame P on the upper end portion of the roof of the vehicle, thereby providing the advantage of minimally reconfiguring the existing vehicle.

Specifically, the frame P may be a rail-type frame mounted along an edge of the roof of the vehicle. Then, the monitoring module M is slid along the frame P. Thus, a position for mounting the monitoring module M is changeable. Therefore, a vehicle-varying position for mounting a sensor may be set without restriction. When a position of the sensor is changeable using an electric motor, a correction or the like can be easily made to a position of the sensor by performing mobility control whenever necessary.

Particularly, the sensor unit S of the monitoring module M may include at least one of a camera sensor, a radar sensor, a lidar sensor, and an ultrasonic sensor. Then, the communication unit C of the monitoring module M may perform communication between the sensor unit S and the vehicle, communication between the vehicle and one other vehicle, or communication between the vehicle and a nearby inter-network infrastructure.

Figure 1:
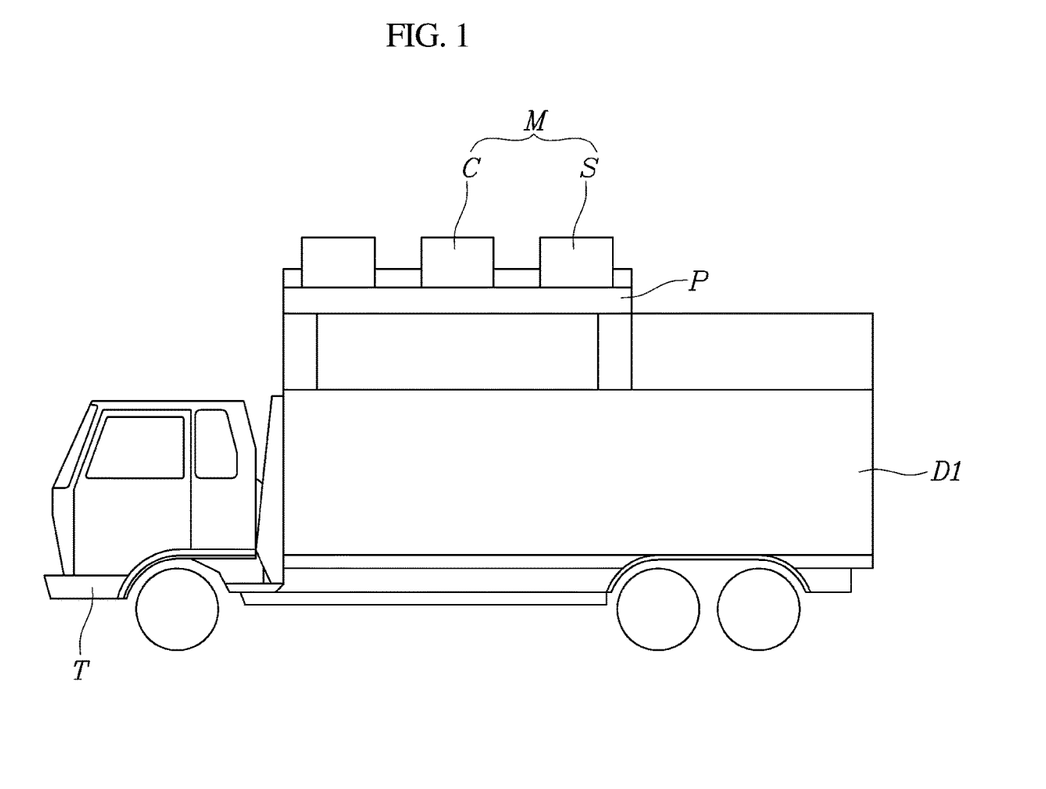
FIGS. 1 to 4 are views each illustrating a state where a detachable traveling guidance system according to an embodiment of the present invention is mounted on a vehicle.
Figure 2:
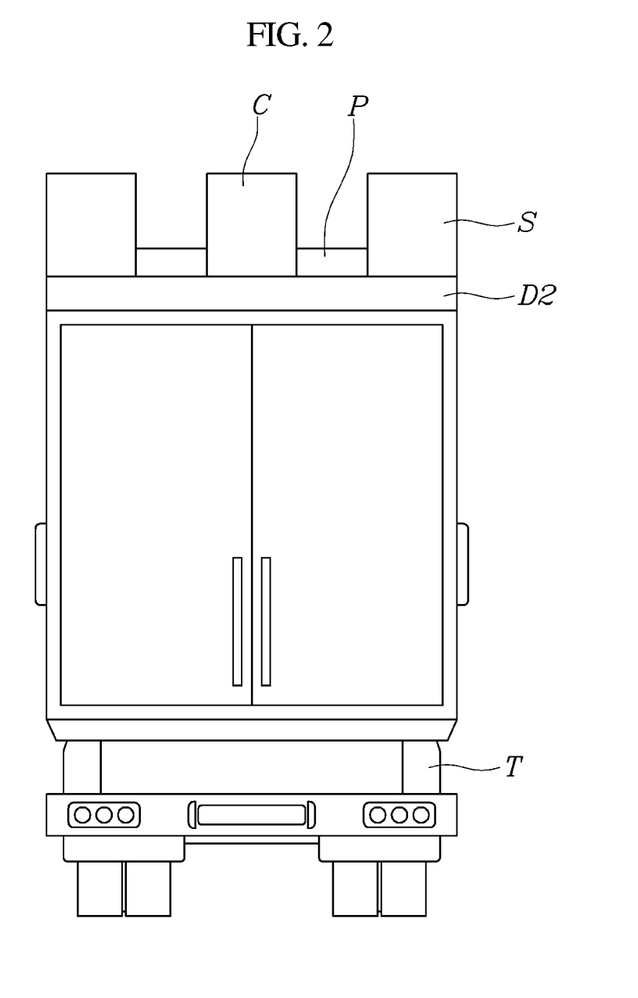

An upper end portion of the display devices D1 is connected to the frame P. The display device D1 may cover a portion other than a glass pane portion of the flank surface of the vehicle. For example, FIGS. 1 and 2 illustrate the display device D1 and D2 on the truck T. The truck T is a commercial vehicle having a gate in the rear side thereof. An upper end portion of the display device D2 may be connected to the frame P, and the display device D2 is mounted on an upper portion of the rear surface of the truck T that does not interfere with the gate. Accordingly, it is possible that only simple information is output on the display device D2, and it is possible that an advertisement or the like is output on the display device D1 on the flank surface.

Figure 3:
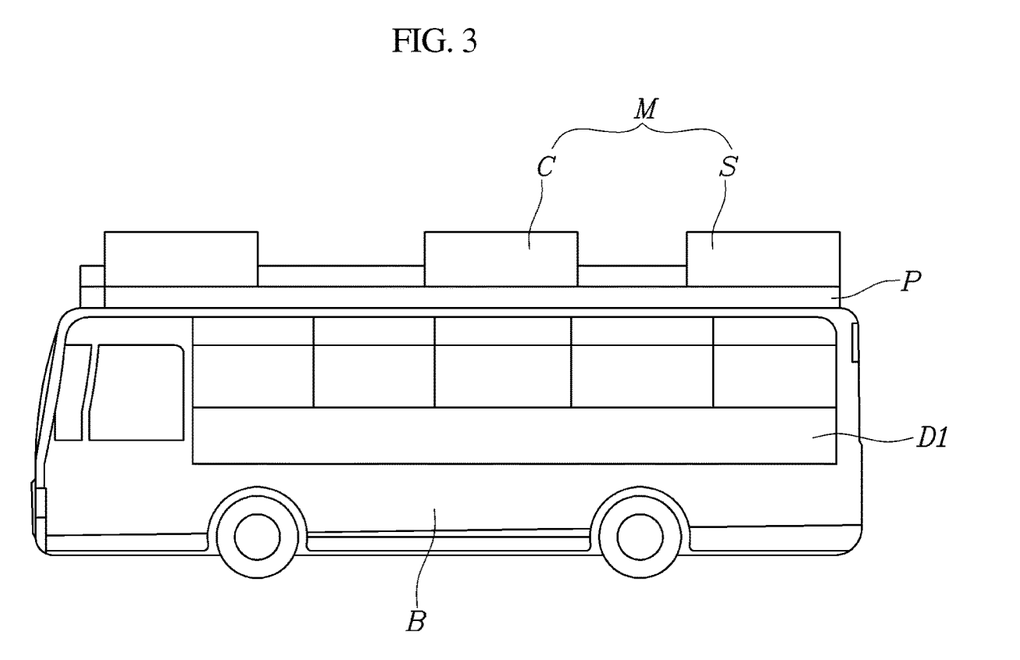
Figure 4:
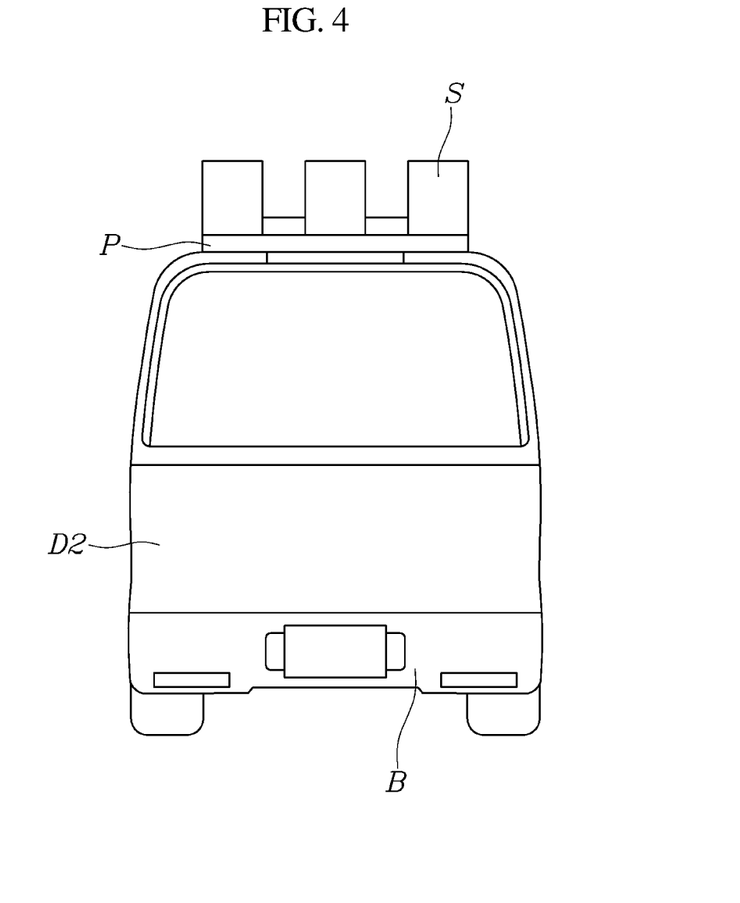

FIGS. 3 and 4 illustrate the display devices D1 and D2 on the bus S. Because the bus S does not have a restriction of a gate being installed in the rear side thereof, or the like, it is possible that a display device with a large-sized screen finds application as the display device D2.

The detachable traveling guidance system according to the present invention may further include a controller C generating necessary information on the basis of information collected through the monitoring module M and outputting on the display devices D1 and D2 the generated necessary information. The controller C may be integrally combined with the communication unit C.

The controller C according to an exemplary embodiment of the present invention may be realized through a nonvolatile memory (not illustrated) and a processor (not illustrated). The nonvolatile memory is configured to store algorithms for controlling operations of various components of the vehicle or data as to software commands for executing the algorithms. The processor is configured to perform operations described below using data stored in the non-volatile memory. The memory and the processor here may be realized as individual chips. Alternatively, the memory and the processor may be realized as a single integrated chip. The processor may be a combination of one or more processors.

During normal operation, the controller C may output an advertisement on the display device. When necessary information is generated, the controller C may output on the display device the generated necessary information.

Specifically, the necessary information may include one or more of information associated with vehicle driving, information associated with a vehicle occupant, information associated with a traffic situation in the vicinity of the vehicle, and information associated with an emergency situation in the vicinity of the vehicle.

FIG. 5 is the flowchart illustrating the operation of the detachable traveling guidance system according to the embodiment of the present invention. A determination is made when there is a likelihood that an accident will occur during vehicle traveling (S100, S110, and S120). When it is impossible to drive the vehicle due to the accident, a wounded occupant or the disabled vehicle is displayed on the display device for alerting a neighboring vehicle and people (S122 and S124). Accordingly, accident handing and lifesaving operations may quickly take place.

That is, a method of guiding vehicle traveling through the detachable traveling guidance system according to the present invention includes Step S112 of outputting an advertisement to a display device; Steps S100, S110, and S120 of generating necessary information on the basis of information collected through a monitoring module; and Steps S122 and S124 of outputting on the display device the necessary information when the necessary information is generated.

In addition, when there is a high likelihood that an accident will occur, the likelihood of the accident occurring in the front direction is alerted to the following vehicle (S126 and S128). Particularly, in most cases, a commercial vehicle has a great height, and thus a driver of the commercial vehicle has difficulty in seeing the following vehicle behind. Through the display device, a situation occurring in the front direction is alerted to the following vehicle, and thus a possible accident may be prevented from occurring successively.

In addition, through the display device, a pedestrian, a bicycle rider, or the like, when appearing in the front direction, is alerted to the following vehicle, and thus the safety may be ensured (S140, S160, and S162). When a vehicle does not follow, an alert is not provided, and thus the sensor and the display device are not used unnecessarily (S164).

In a normal situation where these events do not occur, an advertisement or the like is displayed on the display device and advertising revenue is generated (S112).

A plurality of different types of sensors is provided in the monitoring module M in order to generate necessary information for the controller C. The controller C may assign to each of the sensors a weighting that varies according to a traveling situation of the vehicle and may monitor the vicinity of the vehicle.

That is, in the step of generating the necessary information, the controller C may assign to each of the plurality of different types of sensors provided in the monitoring module M a weighting that varies according to the traveling situation of the vehicle and an environment of a road on which the vehicle travels, may monitor the vicinity of the vehicle, and may generate necessary information.

According to the plurality of different types of sensors provided in the monitoring module M, the controller C may assign to each of the sensors a weighting that varies according to whether or not the vehicle travels in an autonomous traveling mode or according to which direction requires an ADAS function, may monitor the vicinity of the vehicle, and may provide information on the monitored vicinity of the vehicle to the vehicle through the communication unit C.

According to the plurality of different types of sensors provided in the monitoring module M, the controller C may assign to each of the sensors a weighting that varies according to the environment of the road on which the vehicle travels and may monitor the vicinity of the vehicle. That is, according to the plurality of different types of sensors provided in the monitoring module M, the controller C may assign to each of the sensors a weighting that varies according to a type of road on which the vehicle travels or an amount of traffic on the road, may monitor the vicinity of the vehicle, and may provide information on the monitored vicinity of the vehicle to the vehicle through the communication unit C.

FIGS. 6 and 7 are the flowcharts each illustrating the situation-dependent data processing by the detachable traveling guidance system according to the embodiment of the present invention. As illustrated in FIG. 6, using an ADAS sensor module, it is possible that a selection is made among functions (S200 and S220). When the autonomous traveling function is selected, sensor signal processing and a data set that are associated with autonomous traveling are necessary, and data on the environment of the road and a data set for the autonomous traveling function are necessary (S230, S231, and S232). After these data sets are provided, the autonomous traveling is performed (S233, S234, S235, S243, S244, and S245). When the ADAS function is selected, a dataset necessary for the ADAS function also needs to be prepared (S240, S241, and S242).

Particularly, regarding the environment of the road, a road situation is determined (S300 and S320). The road situation may be determined in terms of weather, road information, and road situation (S330, S340, and S350). A weighting necessary for each of the weather, the road information, and the road situation is applied, and thus a data set necessary of each of the weather, the road information, and the road situation is provided (S331, S332, S341, S342, S351, and S352).

FIG. 8 is the block diagram illustrating the weighting assignment process by the detachable traveling guidance system according to the embodiment of the present invention. A weighting that varies according to a function selected from among functions of the sensors or the environment of the road is assigned to each of the sensors. Thus, more useful information on the surrounding environment can be exactly obtained for vehicle traveling.

Specifically, in the case of the autonomous traveling function, road situations in all directions need to be checked. To this end, the sensors mounted on the monitoring module M and the vehicle are all utilized. When processing sensor signals, a weighting that varies according to the FOV, the accuracy (object information), and whether or not to recognize the environment of the road is assigned as follows.

1) When processing sensor signals, a high weighting is assigned to: a camera (mounted camera module), a lidar, and road information provided by a GPS/large-scale map
2) When processing sensor signals, a middle weighting is assigned to: a radar and a camera (mounted on the vehicle)
3) When processing sensor signals, a low weighting is assigned to: an ultrasound module (mounted on the vehicle) and an ultrasound device (mounted ultrasound module)

In the case of the ADAS function, when utilizing the sensor and when processing sensor signals, a weighting varies according to each function.

In the case of lengthwise-direction functions, a front-view detection sensor is utilized. When processing sensor signals, a weighting is assigned as follows.

1) When processing sensor signals, a high weighting is assigned to: a camera (mounted camera module), a radar, and road information provided by a GPS/large-scale map
2) When processing sensor signals, a middle weighting is assigned to: a lidar and a camera (mounted on the vehicle)

In the case of transverse-direction functions (LKA, LFA, and the like), a front-view detection sensor is utilized. When processing sensor signals, a weighting is assigned as follows.

1) When processing sensor signals, a high weighting is assigned to: a camera (mounted camera module), a lidar, and road information provided by a GPS/large-scale map
2) When processing sensor signals, a middle weighting is assigned to: a radar and a camera (mounted on the vehicle)

In the case of a sideways-view/rear-view monitoring function (BCW), a sideways-view radar and a sideways-view camera are set to have a higher weighting than an ultrasound module when processing sensor signals. In this case, a weighting is assigned as follows.

1) When processing sensor signals, a high weighting is assigned to: a sideways-view radar and a camera (mounted camera module)
2) When processing sensor signals, a middle weighting is assigned to: an ultrasound module In order to reflect the information on the environment of the road, when processing a signal of each of the sensors, a weighting is determined by utilizing road information provided by a navigation device, road traffic situation information (information on whether or not a detected amount of traffic is large or small) of the front-view sensor, road information obtained through V2X, and the like.

In the case of a weather environment, if it rains or snows, or it is night, when processing sensor signals, a weighting is assigned as follows.
1) When processing sensor signals, a high weighting is assigned to: a radar and road information provided by a GPS/large-scale map
2) When processing sensor signals, a middle weighting is assigned to: a lidar
3) When processing sensor signals, a low weighting is assigned to: a camera Regarding the road information, in the case of a bridge or a tunnel, a weighting is assigned as follows.
1) When processing sensor signals, a high weighting is assigned to: a lidar and road information provided by a GPS/large-scale map
2) When processing sensor signals, a middle weighting is assigned to: a radar and a camera In addition, in the case of the road situation, a weighting that varies according to a downtown area, an expressway/national highway, and whether or not an amount of traffic is large or small is assigned as follows.
1) When processing sensor signals, a high weighting is assigned to: a lidar, a camera, and road information provided by a GPS/large-scale map
2) When processing sensor signals, a middle weighting is assigned to: a radar That is, a data set may be configured according to a result of processing sensor signal data on the basis of the function, such as the autonomous function, or on the basis of the environment of the road. A data set for the environment of the road may be set to be subordinated to a data set for each of the functions. Regarding this data set, according to an occupant's request or an occupant's final function selection, a sensor data output unit may be set to output a data set according to the selected function.

The detachable traveling guidance system according to the present invention is easily mountable or separable on and from a typical commercial vehicle, such as a typical bus or a truck. The detachable traveling guidance system serves as a supplement to performing the autonomous traveling function and provides an advertisement or various necessary information to the vicinity of the vehicle. Thus, when equipped with the detachable traveling guidance system, the typical commercial vehicle is capable of functioning as a multi-purpose autonomous traveling vehicle.

As described above, there is provided a detachable vehicle-traveling guidance system and a method of guiding vehicle traveling. The system is easily mountable and separable on and from a typical commercial vehicle, such as a typical bus or a truck. Accordingly, the system serves as a supplement to performing an autonomous traveling function and provides an advertisement or various necessary information to the vicinity of the typical commercial vehicle. When equipped with the system, the typical commercial vehicle is capable of functioning as a multi-purpose autonomous vehicle.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A detachable traveling guidance system comprising:
   a frame detachably mounted on a roof of a vehicle;
   a monitoring module comprising a sensor array configured to monitor a vicinity of the vehicle and a communicator;
   the monitoring module being mounted on the frame, and the frame being configured to adjust a position of the monitoring module; and
   a display mounted on a lower portion of the frame and positioned to cover a side surface or a rear surface of the vehicle, necessary information being output on the display device for viewing from the outside.

2. The detachable traveling guidance system of claim 1, wherein the frame is a rail-type frame mounted along an edge of the roof of the vehicle.

3. The detachable traveling guidance system of claim 1, wherein the monitoring module is configured to slide along the frame to change a position of the monitoring module on the frame.

4. The detachable traveling guidance system of claim 1, wherein the sensor array comprises any one or any combination of a camera sensor, a radar sensor, a lidar sensor, and an ultrasonic sensor.

5. The detachable traveling guidance system of claim 1, wherein the communicator is configured to communicate between the sensor array and the vehicle, to communication between the vehicle and another vehicle, or communication between the vehicle and a nearby internetwork infrastructure.

6. The detachable traveling guidance system of claim 1, wherein an upper portion of the display device is connected to the frame and covers a portion other than a glass pane portion of the side surface of the vehicle.

7. The detachable traveling guidance system of claim 1, wherein the vehicle is a commercial vehicle having a gate in a rear side thereof, and the display is mounted on an upper portion of the rear surface of the commercial vehicle that does not interfere with the gate, an upper portion of the display being attached to the frame.

8. The detachable traveling guidance system of claim 1, further comprising:

a controller configured to generate information on the basis of information collected through the monitoring module and to output the generated information on the display device.

9. The detachable traveling guidance system of claim 8, wherein the controller is further configured to output an advertisement on the display device, and to output the generated necessary information on the display device, in response to the necessary information being generated.

10. The detachable traveling guidance system of claim 8, wherein the generated information comprises any one or any combination of information associated with a driving of the vehicle, information associated with an occupant of the vehicle, information associated with a traffic situation in the vicinity of the vehicle, and information associated with an emergency situation in the vicinity of the vehicle.

11. The detachable traveling guidance system of claim 8, wherein a plurality of sensors are provided in the sensor array, and the controller is further configured to assign a weight to each of the plurality of the sensors according to a traveling situation of the vehicle, and the plurality of sensors are configured to monitor the vicinity of the vehicle.

12. The detachable traveling guidance system of claim 8, wherein a plurality of sensors are provided in the monitoring module, and the controller is further configured to assign a weight to each of the plurality of the sensors according to any one or any combination of whether or not the vehicle travels in an autonomous traveling mode or a direction that requires an ADAS function, and the plurality of sensors are configured to monitor the vicinity of the vehicle, and to provide information on the monitored vicinity of the vehicle to the vehicle through the communicator.

13. The detachable traveling guidance system of claim 8, wherein a plurality of sensors are provided in the monitoring module, and the controller is further configured to assign to each of the sensors a weight according to an environment of a road on which the vehicle travels and the plurality of sensors are configured to monitor the vicinity of the vehicle.

14. The detachable traveling guidance system of claim 1, wherein a plurality of sensors are provided in the monitoring module, and the controller is further configured to assign a weight to each of the sensors according to a type of road on which the vehicle travels or an amount of traffic on the road, and the plurality of sensors are configured to monitor the vicinity of the vehicle, and to provide information on the monitored vicinity of the vehicle to the vehicle through the communicator.

15. A processor-implemented method of guiding a vehicles through a detachable traveling guidance system, the method comprising:
   monitoring a vicinity of a subject vehicle using a monitoring module comprising a sensor array;
   outputting an advertisement on a display device of a target vehicle following the subject vehicle;
   generating information related to the subject vehicle based on information collected through the monitoring module; and
   selectively replacing the advertisement with the information related to the subject vehicle on the display device of the target vehicle based on objects detected in front of the subject vehicle and a distance between the subject vehicle and the target vehicle.

16. The method of claim 15, wherein a plurality of sensors are provided in the sensor array, and the generating of the information comprises generating the information based on a weight that varies according to a traveling situation of the vehicle, an environment of a road on which the vehicle travels, and the monitoring of the vicinity of the vehicle.

17. A processor-implemented method of guiding a vehicle through a detachable traveling guidance system, the method comprising:
   monitoring a vicinity of the vehicle using a monitoring module comprising a sensor array;
   outputting an advertisement on a display device;
   generating information on the basis of information collected through the monitoring module; and
   outputting the generated information on the display device, in response to the information being generated,
   wherein a plurality of sensors is provided in the sensor array, and generating the information comprises generating the information based on a weight that varies according to a traveling situation of the vehicle, an environment of a road on which the vehicle travels, and the monitoring of the vicinity of the vehicle.

* * * * *